United States Patent [19]

Orita

[11] 4,122,445
[45] Oct. 24, 1978

[54] BREAKAGE DETECTOR HAVING A CONDUCTIVE BENT METALLIC LEAF SPRING THEREIN

[75] Inventor: Kohji Orita, Utsunomiya, Japan

[73] Assignee: Hokuseki Sangyo Kabushiki Kaisha, Japan

[21] Appl. No.: 697,693

[22] Filed: Jun. 18, 1976

[30] Foreign Application Priority Data

Jun. 18, 1975 [JP] Japan .................. 50-84126[U]

[51] Int. Cl.² .............. G08B 13/02; G08B 13/04
[52] U.S. Cl. ................. 340/566; 200/61.49; 340/501; 200/61.01
[58] Field of Search ............ 340/261, 274 R; 200/61.49, 61.51, 61.01, DIG. 8, DIG. 20; 73/70.2, 71.2

[56] References Cited

U.S. PATENT DOCUMENTS

| 2,741,675 | 4/1956 | Chase et al. | 340/261 |
| 2,885,504 | 5/1959 | Yurtz | 200/61.49 |
| 3,521,266 | 7/1970 | Hall | 340/261 |
| 3,899,784 | 8/1975 | McHenry | 340/274 R |
| 3,973,095 | 8/1976 | Greene | 340/274 R |

Primary Examiner—Glen R. Swann, III
Attorney, Agent, or Firm—Armstrong, Nikaido, Marmelstein & Kubovcik

[57] ABSTRACT

The detector is primarily for detecting glass breakage and is constructed as a sensing element for detecting the breakage and generating an alarm signal. The detector generally comprises a thin cylindrical casing including a first leaf spring and a second leaf spring having a plurality identations or bends thereon for absorbing noise signals below a breakage frequency signal when a glass panel is actually broken or cut.

4 Claims, 6 Drawing Figures

BREAKAGE DETECTOR HAVING A CONDUCTIVE BENT METALLIC LEAF SPRING THEREIN

FIELD OF THE INVENTION

The present invention relates in general to a device for detecting breakage in a solid substance such as a glass panel. More particularly, the present invention is directed to a device associated with an alarm means and is only activated upon breakage of a glass panel.

DESCRIPTION OF THE PRIOR ART

There have been various devices designed for detecting glass breakage in buildings or stores. In some buildings, stores or other establishments, considerable amounts of money are spent in installing and maintaining these devices.

A typically conventional device, such as shown in FIG. 1, includes a casing 7 which comprises a fixed base 3, a movable leaf spring 1, an end of which being secured on the fixed base, an electrode 4, an inertia weight 2 provided on another end of the leaf spring 1, an adjusting screw 5 and electric terminals 6, 6 mounted at each end of the fixed base 3. The device is disposed at one area of a glass panel for detecting a breakage frequency through the leaf spring when a breakage occurs, and also for converting said breakage frequency into an open-and-shut signal for an alarm means.

The conventional device must be fixed on the glass panel in full consideration of a shape, a thickness and a location of said panel as well as an environmental condition such as temperature and humidity, and it requires periodic maintenance as well as contact adjustment for the electrodes.

However, the detector has another key drawback, in that it becomes inoperative through a contact adjustment. Even if the device is carefully installed on the glass panel and contact pressure is correctly adjusted, the glass panel is too easily subject to vibration so as to operate the detector to give out false alarms.

For instance, the glass panel is easily caused to vibrate by wind, a passing motor vehicle with a heavy load or a hard knock. This vibration operates the detector so that a false alarm is transmitted even when the breakage does not actually occur. In this situation, it is necessary for a guardsman to rush to the building or store where the alarm signal is transmitted to investigate a cause of the false signal. After the repeated transmissions of the false signal, it is likely that the guardsman will adjust the detector by means of a screw bolt 5 so that it will not transmit a false alarm carelessly through the noise frequency or malfunction. Then, the detector does not operate accurately when the glass panel is actually broken or cut by a burglar, thus causing an unfavorable result for the guard business and crime protection. There have been no positive devices to discriminate between a hard knock, for example, and an actual breakage.

SUMMARY OF THE INVENTION

The principal object of the invention is to provide an improved breakage detector preferably for detecting a breakage frequency when a breakage occurs in a glass panel and also for detecting a shock substantially strong enough to break said glass panel.

Another object of the invention is to provide an improved breakage detector whereby a breakage frequency or shock substantially strong enough to break a glass panel can be detected to actuate said breakage detector and to generate an alarm signal.

A further object of the invention is to provide an improved breakage detector whereby a hard knock and an actual breakage can be accurately discriminated so that a noise frequency not requiring a guard or crime protection is not be transmitted as an alarm.

Still another object of the invention is to provide an improved breakage detector that is relatively inexpensive, easy to install, and can be maintained at relatively low cost.

BRIEF DESCRIPTION OF DRAWINGS

These and other objects and advantages are obtained by the invention, which is described hereinbelow in connection with the accompanying drawings, wherein.

DESCRIPTION OF INVENTION IN RELATION TO DRAWINGS

Figure 1:
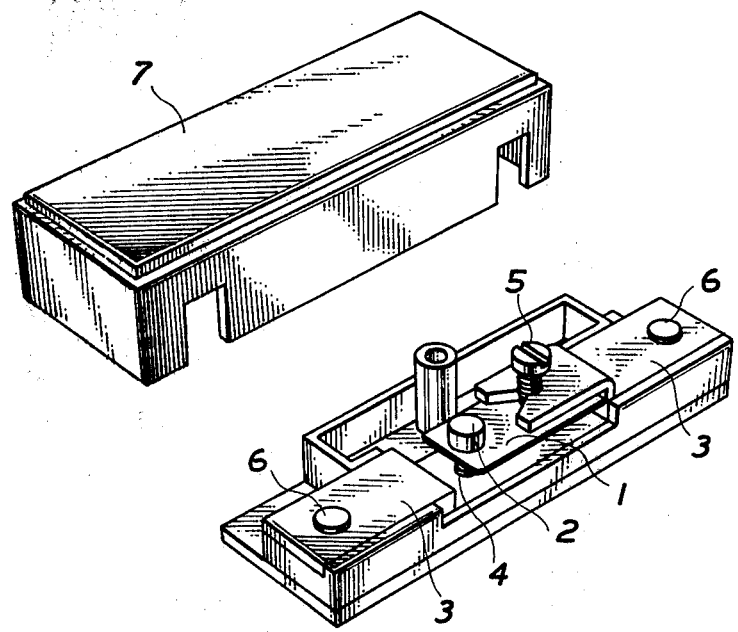
FIG. 1 is a perspective view of a conventional breakage detector, from which a casing is disengaged.
Figure 2:
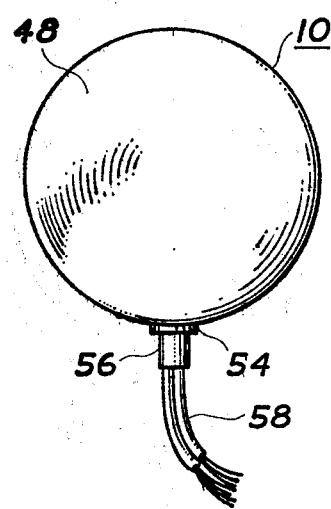
FIG. 2 is a front elevation of a breakage detector as contemplated in a preferred embodiment of the invention.
Figure 3:
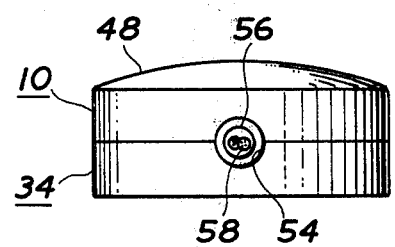
FIG. 3 is a bottom view of the breakage detector as shown in FIG. 2.

Referring now to the accompanying drawings, a first straight conductive metallic leaf spring 12 is provided with an electrode 14 on an upper face at one end portion thereof. A second conductive metallic leaf spring 16 having an electrode 18 on a lower face at one end portion thereof is slightly bent at several portions 20, 20, 20 along its longitudinal direction to form a noise frequency absorber.

Interposed between the leaf springs 12 and 16 are insulators 24. The insulators 24 and springs 12 and 16 form a base portion 26 which holds the electrodes 14, 18 in contact with each other.

The base portion 26 of these leaf springs 12 and 16 are integrally mounted by a washer 30 and set screws 32, 32 on an inner bottom 36 of a lower circular casing 34 having a rim 40 around the periphery of an outer bottom 38 and also having a semicircular opening 44 cut into a flange 46 on the lower casing. A semicircular opening 52 which is the same as the opening 44 of the lower casing 34 is symmetrically cut into a flange 50 on an upper casing or cap 48. Accordingly, when the lower casing 34 is inserted into the upper casing 48 to form a thin cylindrical casing, a circular opening 54 is defined to allow a hermetrical insertion of a reinforcing tube 56 for lead wires 58, 58.

Figure 4:
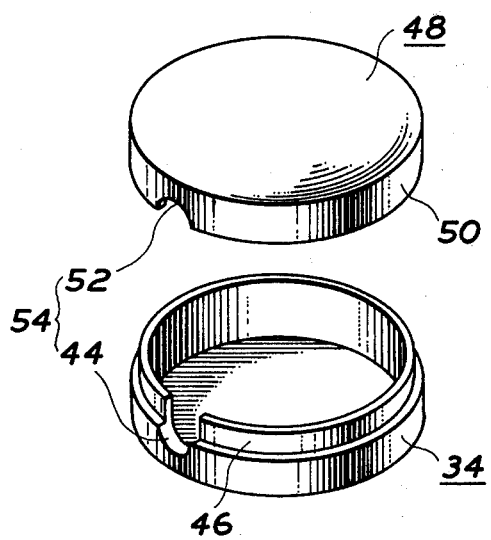
FIG. 4 is a perspective view of each of an upper and a lower casings.
Figure 5:
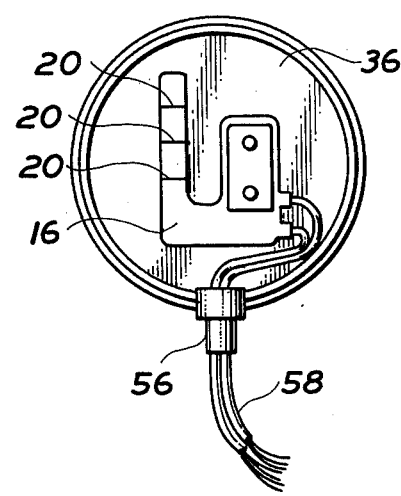
FIG. 5 is a plan view of the breakage detector, from which an upper casing is disengaged.
Figure 6:
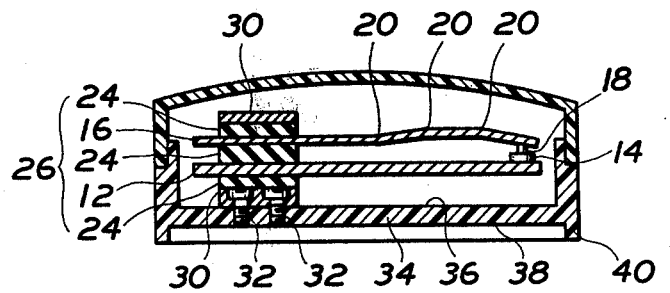
FIG. 6 is a detailed portion cross sectional and broken view of the essential feature of the breakage detector made in accordance with the present invention.

As shown in FIG. 4, an upper half portion of the flange 46 of the lower casing 34 is diametrically stepped to allow a hermetrical insertion into the upper casing 48. One end of the leads 58 are connected to each end of the leaf springs 12, 16. The leads extend from the casing through the reinforcing tube 56.

The breakage detector of the present invention can be easily attached to an inside of the glass panel by an adhesive agent filled into the outer bottom 38 of the lower casing 34 so that a loop is established between the detector 10 and a central monitor (not shown), with the leads 58 being connected to the central monitor. Even before cementation, the adhesive agent thus filled into the outer bottom around said detector 10 does not leak out of the rim 40. In addition, the detector needs neither periodic maintenance nor sensitivity control.

Through the bends 20, 20, 20 of the second leaf spring 16, the environmental changes such as temperature and humidity as well as a low frequency caused by minor vibration are almost absorbed so that the electrodes 14 and 18 are not disengaged, which would cause a signal to be sent to an alarm means.

On the other hand, the detector 10 is only activated upon detection of the breakage frequency when a breakage occurs or upon a shock substantially strong enough to break the glass panel. If the glass panel is knocked but not broken, a signal on this order of frequency is not generated.

In consequence, the present breakage detector 10 does not give out the false alarms, but it generates the alarm signals without fail only upon detection of the breakage frequency. That is, when a breakage occurs, the electrode 18 of the second leaf spring 16 is disengaged from the electrode 14 of the first leaf spring 12 which causes a breakage frequency signal to be applied to the alarm means. Furthermore the thin cylindrical breakage detector 10 thus attached onto the glass panel does not deteriorate the appearance.

In accordance with the present invention, it should now become apparent to one skilled in the art that numerous other embodiments and modifications thereof are contemplated as falling within the scope of the present invention. The scope of this invention shall be interpreted by the following claims.

What is claimed is:

1. A device for detecting breakage of a solid material, said device comprising;
   a cylindrical casing fixed on one area of said material for establishing a loop with a monitor, said cylindrical casing comprising an upper cylindrical casing and a lower cylindrical casing inserted and hermetically sealed into said upper casing;
   a first straight conductive metallic leaf spring having an electrode on an upper face at one end thereof;
   a second conductive metallic leaf spring having an electrode on the lower face at one end thereof and a plurality of bends therein along its longitudinal direction;
   insulator means positioned between the other ends of said first and second leaf springs and on the lower surface of the other end of said first leaf spring and on the upper surface of the other end of said second leaf spring wherein said insulator means and said first and second leaf springs are mounted within said lower casing and wherein said first and second leaf springs are biased such that said electrodes thereon are normally in contact;
   lead wires connecting said leaf springs to said monitor;
   wherein upon the occurrence of a break in said solid material said electrodes are separated causing a breakage signal to be transmitted to said monitor through said lead wires.

2. The breakage detector of claim 1, wherein the sides of said upper and lower casings are flanges and wherein an upper half portion of the flange of the lower casing is diametrically stepped to allow a hermetrical insertion into the upper casing so as to form a cylindrical casing.

3. The breakage detector of claim 1, wherein a rim is formed around the periphery of the bottom of the lower cylindrical casing, the space formed by the bottom and rim containing an adhesive agent therein for attaching said cylindrical casing to said solid material.

4. The breakage detector of claim 1, wherein a semicircular opening is symmetrically formed in the upper and lower casings such that a circular opening is formed and a reinforcing tube is hermetically inserted therein and wherein said lead wires pass through said tube.

* * * * *